May 9, 1950 — O. SANDVIK ET AL — 2,507,459
ANTIBLURRING DEVICE FOR AERIAL CAMERAS
Filed Nov. 27, 1945
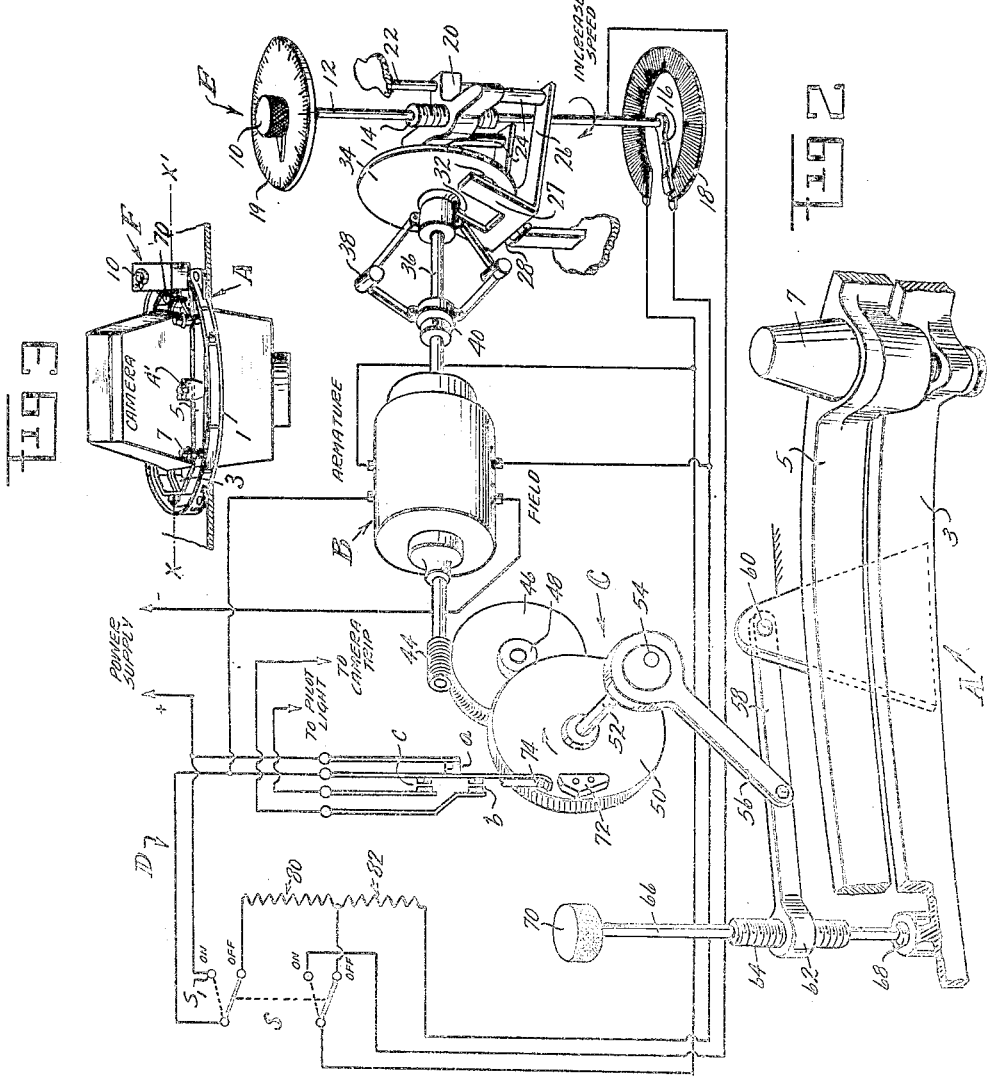
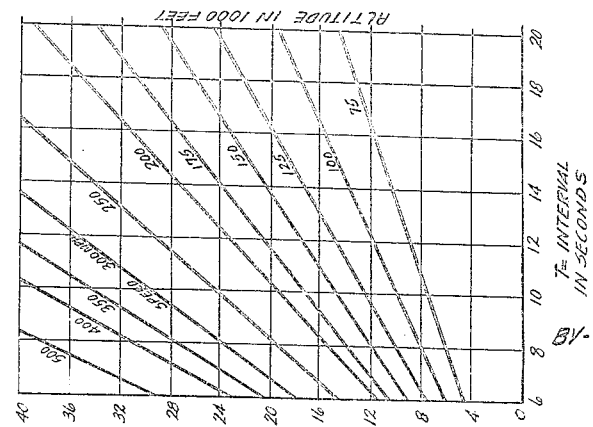
- INVENTORS -
OTTO SANDVIK
J. S. CHANDLER
- ATTORNEYS -

Patented May 9, 1950

2,507,459

UNITED STATES PATENT OFFICE 2,507,459

ANTIBLURRING DEVICE FOR AERIAL CAMERAS

Otto Sandvik and Jasper S. Chandler, Rochester, N. Y., assignors, by mesne assignments, to the United States of America as represented by the Secretary of War Application November 27, 1945, Serial No. 631,004

7 Claims. (Cl. 88—16)

This invention relates to aerial cameras and more particularly to a device for oscillating an aerial camera in order to compensate for the speed and altitude of an associated aircraft from which pictures of the terrain are being taken.

The blurring effect produced by movement of the plane relative to the ground may be effectively eliminated if the camera is rotated in such a way as to cause the optical axis to pass through a fixed point on the ground during exposure. It has been found that the change of angular position and distance of ground objects relative to the camera are of secondary importance for the usual exposure, film speed and altitude. The method of providing pivotal motion of a camera at a certain rate may be termed a "sweep" method and the mechanism disclosed herein will be hereinafter referred to as a "sweep mechanism." There appear to be certain advantages of the sweep method over other methods which may require optical complications and accurate moving mechanisms and have the attendant risk of deterioration of the optical definition.

Accordingly, it is an object of our invention to provide a sweep mechanism of a relatively simple nature for pivoting a camera at a predetermined rate during exposure in order to compensate for the ground speed and altitude of an associated plane to eliminate blurring of the photographic image.

A further object of our invention is to provide a structure having combined sweep and intervalometer functions in the same device and utilizing common elements to a large extent, thereby eliminating the need for extra equipment and providing an economical and compact unit for use in conjunction with aerial cameras.

Figure 1 is a graph of the "Time vs. Altitude" cycle for a series of velocities of an aircraft having a camera mounted thereon with a twenty-four inch focal length lens and a 9" film width and incorporating our invention.

Figure 2 is a schematic illustration partially in perspective, illustrating the mechanical and electrical elements of our device, parts being broken away and shown in section; and Figure 3 is a perspective view illustrating the general camera supporting arrangement in a boxed unit housing the elements illustrated in Figure 2.

In general, in order to insure complete coverage of the terrain in photographing from the air, a sixty per cent overlap between consecutive photographs is utilized. For such a sixty per cent overlap it can be shown that the time interval between successive pictures is:

$$T = 0.2727 \frac{wA}{fV} \tag{1}$$

where:

$T$ = Time interval between successive pictures, in seconds;
$w$ = Picture width in the direction of flight, in inches;
$A$ = Altitude of plane in feet;
$f$ = Focal length of lens, in inches;
$V$ = Ground velocity in miles per hour;

It may be further shown that $$v = 1.467 \frac{fV}{A} \tag{2}$$

where:

$v$ = Required compensatory velocity of image travel to hold image fixed with respect to the film during exposure, in inches per second;

By combining these two equations it will be found that $$v = 0.4 \frac{w}{T} \tag{3}$$

from whence it will be seen that for a fixed value of $w$, $v$ is dependent only upon the interval $T$ and from which it follows that the sweep mechanism may be automatically set for a required $v$ when the intervalometer sub-combination of our invention is properly set, all as will be hereinafter described in detail.

The sweep mechanism may impart any suitable movement to the camera as long as the proper velocity is imparted during exposure and the camera returned to the initial position so that the cycle may be repeated at an interval of $T$ seconds. The duration of exposure is extremely short compared to the interval $T$ so that a sinusoidal movement is entirely adequate if exposure takes place at the midposition of the backward sweep of the camera as it oscillates about an axis transverse to the flight path.

By way of further explanation, attention is called to Figure 1 of the drawings which shows a graph of T vs. Altitude for a series of velocities of an aircraft. This graph is for a camera having a twenty-four inch focal length lens and a film width of nine inches in the direction of flight, which is conventional for military use, and it will be understood that the graph represents time intervals for the usual sixty percent overlap. For the camera described, equation one reduces to $$T = 0.1023 \frac{A}{V}$$

and the graph shows the upper and lower limits of altitude at a given velocity, it being understood that the time interval in seconds is adjusted within the range of from six to twenty seconds in this case, depending on the specific velocity and altitude to eliminate blurring of photographs.

The details of our invention will now be described in conjunction with the other figures of the drawings; namely, Fig. 2 which shows schematically, and partially in perspective, the electrical and mechanical elements of our device; and Fig. 3 which is a perspective showing the general arrangements of an aerial camera and a boxed unit housing the elements illustrated in Fig. 2. With reference to Figs. 2 and 3, the components of our invention comprise a ring mount A on which the camera is secured. The ring mount A is broadly defined as a camera element for our purposes and comprises a ring 3, pivotally supported for movement about an axis $x$—$x'$ within an outer ring 1 fixed to the aircraft fuselage, and a ring 5 above and secured to ring 3 through cushion devices 7, it being understood that the camera is rigidly secured to the ring 5 by clamps A' and that it pivots with the rings 3 and 5 about the axis $x$—$x'$ which extends transversely of the path of flight. A motor B supplies mechanical driving power for oscillating the ring mount A and a mechanism C is provided through which the ring mount is driven. An electrical circuit D is used in conjunction with the mechanism C for energizing the motor predetermined by a manually operable speed control arrangement E. The various elements of our invention B through E are adapted to be housed in a casing F for convenient mounting in conjunction with ring mount A, as illustrated in Fig. 3.

Attention is now called to Fig. 2 wherein is disclosed a manually operable knob 10 secured to a shaft 12 which has a threaded portion 14 intermediate its length and terminates in a potentiometer comprising a rotary arm 16 which engages a resistance wire winding 18. The potentiometer elements 16 and 18 are connected to the motor energizing circuit in such a manner that rotation of shaft 12 increases or decreases the resistance in series with the armature and field of the motor B, depending on the direction of rotation of knob 10 for the purpose of providing a predetermined speed of motor B in accordance with a selected time interval between pictures as indicated by a calibrated scale 19. The threaded portion 14 engages a nut member 20 which is guided for reciprocal motion by a bar 22, member 20 being arranged to slide on bar 22. Member 20 has a pair of integrally secured rods 24 arranged in a forked configuration and adapted to engage the forked arms of a member 26 which is pivotally secured at the fixed point 28 so as to be rockable about the pivot provided at 28 when the knob 10 is turned, causing the nut member 20 to ride up or down on shaft 12. As will be seen on the drawing, member 26 has an additional pair of forked arms 27 which carry buttons 32 of any suitable frictional material. The buttons 32 are adapted to frictionally engaged a plate 34 which is slidably arranged on a shaft 36 of the motor B, being reciprocated thereon by a conventional flyball governor 38, which may be of the spring loaded type fixed to shaft 36 at 40. The arrangement is such that the frictional buttons 32 are brought closer to the plate 34 by adjustment of knob 10 for proportionately lower speeds of the motor B so that should any tendency for the motor to overspeed develop, plate 34 will be brought into frictional engagement with buttons 32 to counteract the tendency. The motor B drives the mechanism C which comprises a worm gear 44 driving a worm wheel 46 which through a pinion 48 drives a gear 50, whence rotation is transmitted through a shaft 52 to an eccentric member 54 adapted to actuate a strap and rod member 56, causing oscillation of a link 58 about a fixed pivot point 60. Link 58 has at one end thereof a nut member 62 which threadedly engages a threaded portion 64 of an adjustable leveling member 66 having an extremity 68 pivotally secured to the ring mount A by means of a ball joint, as shown, and having its other extremity provided with a knob 70 for convenient adjustment to level the ring mount A. The gear 50 has an interrupter member 72 secured thereto which is adapted to engage and deflect a flexible spring leaf 74 at a predetermined point in the travel of member 72, it being particularly noted that such predetermined point corresponds to the point at which ring mount A is in a horizontal position, with the optical axis of the camera vertical. Spring leaf 74 actuates pairs of contacts at $a$, $b$ and $c$, it being understood that the contact points at $a$ are normally engaged while those at $b$ and $c$ are normally disengaged. Power is supplied from the line directly to the contact points at $a$ and thence to a double-pole, double-throw switch S and it will be noted that when the switch is in the "on" position current flows to the switch point $S_1$ thence through the contact points at $a$ to the armature but that there is a simultaneous path provided so that current also flows through the switch from $S_1$ directly to the armature, i. e., when the switch is in the "on" position current goes to the armature independently of any current path through the contact points at $a$. Accordingly, it will be seen that disengagement of the contacts at $a$ by deflection of leaf 74 as effected by the revolving interrupter member 72 would have no effect on the motor provided the switch S is in the "on" position. Such deflection of leaf 74, however, has the effect of closing contacts at $b$ and $c$ for operating or tripping the camera shutter and energizing a pilot light, as indicated, the frequency of tripping being of course dependent on the predetermined interval selected by knob 10 in accordance with the calibrated scale 19. When, however, the switch is in the "off" position a fixed resistance 80 is shunted across the armature and fixed resistance 82 is shunted across resistance 18, and at this time the armature current passes totally through the contacts at $a$. The electrical circuit arrangement is such that the motor B then rotates at very reduced speed, depending on the values of the resistances 80 and 82 so that when the interrupter member 72 next deflects the leaf 74, thus breaking the contact at $a$, there will be little or no inertia in the motor or in the mechanical parts of the system tending to cause any appreciable over-travel of the ring mount A past the point at which it was in its oscillatory path at the instant engagement of the contacts at *a* was broken. It is contemplated as heretofore explained that the ring mount A will be level or horizontal at the time of disengagement at *a* so that the camera will be in normal vertical position, that is the optical axis thereof will be erected for normal picture taking use.

It will be noted that our device trips the shutter at the instant that the optical axis of the camera is in verical position, the mechanical arrangement being such that the camera is in a backward sweep with reference to the direction of flight during exposure, although obviously the instant of tripping with respect to the inclination of the camera could be adjusted as desired by means of the knob 70.

We believe that our teaching may be used for motivating other camera elements besides ring mounts, e. g., lenses or film magazines, to achieve an anti-blurring effect, and we seek protection for our invention within the scope of the following claims.

We claim:

1. In aerial camera supporting apparatus of the class described for use in conjunction with an aerial camera and shutter for taking photographs of the terrain below from an aircraft while flying thereover, a support to be fixedly carried by the aircraft, a camera support tiltably carried by the fixed support for oscillation about a horizontal axis transverse to the direction of travel of the aircraft, a motor carried by the fixed support including a motor drive circuit, oscillating means including actuating connecting means between the motor and the camera support at one side of the oscillation axis for oscillating the camera support in the vertical plane of travel of the aircraft to prevent relative movement of the photographic axis of the camera at the intersection of said axis with the terrain being photographed during oscillating movement of the camera support in one direction, means operable by said oscillating means for actuating the camera shutter at a predetermined point in the swinging movement of the camera support in said one direction, means for varying the length of the actuating connecting means to adjust the relative position of the arc of oscillation of the camera support to vary the position in the said arc where the camera shutter is actuated, to adjust the position of the camera photographic axis, relative to the plane of the terrain being photographed at the time when the camera shutter is actuated to make the photographic exposure.

2. Apparatus as claimed in claim 1 including an electric motor drive circuit connected to the motor for operating the same at a predetermined speed, and variable resistance means in said motor drive circuit for varying the speed of the motor to compensate for change in the speed of the aircraft while traveling across the terrain being photographed.

3. Apparatus as claimed in claim 2 including switch and secondary motor circuit means in said motor drive circuit for introducing a secondary control circuit and resistance in the motor drive circuit for operating the motor at a reduced speed, interrupter means in said secondary control circuit for interrupting the secondary control circuit to stop the motor, including means operable by the actuating connecting means, for interrupting the motor circuit at a predetermined position in the oscillation of the camera support.

4. In a mechanism of the class described for use in conjunction with an aerial camera, a motor means, an operating circuit therefor, manually operable speed control means in said operating circuit for regulating the speed of said motor means, a camera support tiltable about a horizontal axis transverse to the direction of travel of the aerial camera when carried by an aircraft over a terrain to be photographed, actuating means between the camera support and the motor for swinging the camera support about its tilt axis to maintain a photographic image of the terrain below an aerial camera that is carried by said camera support, substantially stationary on the camera focal plane during travel over the terrain, an interrupter member, a motor control circuit controlled thereby, means operable by said actuating means for actuating said interrupter member to open said motor control circuit at a predetermined point in the swing of said camera support and switch means for connecting said motor control circuit in said motor operating circuit for arresting tilting movement of the camera support at said predetermined point in its oscillation.

5. In a mechanism of the class described for use in conjunction with an aerial camera, a motor means, manually operable speed control means for said motor means, means driven by said motor means for actuating a camera element to maintain a photographic image in fixed position on the focal plane of a camera, an interrupter member associated with said latter means and actuatable responsive to motion thereof, and an electrical circuit associated with said interrupter member and adapted to deenergize said motor responsive to actuation by said interrupter member at a predetermined point in the travel of said latter means, wherein said motor means comprises an electric motor and wherein speed control means comprises a variable resistance in said motor circuit, said electric circuit comprising a pair of normally engaged contact points adapted to be disengaged by said interrupter member, manually operable switch means in said motor circuit and connected in parallel with said normally engaged contact points to said motor, fixed resistance means connected to said manually operable switch means and adapted to be placed in said motor circuit in substitution for said variable resistance means when said manually operable switch means is in cut-off position, whereby rotation of said motor continues subsequent to operation of said switch means to cut-off position until said contact points are disengaged by operation of said interrupter member at a predetermined point in the travel of said camera element.

6. In a device as set forth in claim 5 including a pair of normally disengaged contact points adapted for engagement by operation of said interrupter member substantially contemporaneously with disengagement of said normally engaged contact points.

7. In a mechanism of the class described for use in conjunction with an aerial camera, an electric motor, manually variable speed control means for said motor comprising a potentiometer connected in said motor circuit in such a manner as to maintain substantially constant armature and field current, mechanical means driven by said electric motor for actuating a camera element to maintain a photographic image in substantially fixed position on the focal plane of a camera, an interrupter member driven by said mechanical means, an electric circuit associated with said motor and comprising a pair of normally engaged contact points adapted to be disengaged by said interrupter member at a predetermined point in the travel thereof, a double-pole, double-throw manually operable switch and a voltage divider resistance in said electric circuit, said switch and said latter resistance and said potentiometer being so connected as to place said resistance in the armature and field circuits of said motor in substitution for said potentiometer when said switch is in cut-off position, whereby operation of said motor continues until said interrupter member reaches said predetermined point in its travel, thereby causing disengagement of said normally engaged contact points to deenergize said motor, said voltage divider resistance having a resistance value such that operation of said motor after said switch is in cut-off position continues at a substantially reduced speed to the point of deenergization.

OTTO SANDVIK.
JASPER S. CHANDLER.

REFERENCES CITED

The following references are of record in the file of this patent:

UNITED STATES PATENTS

| Number | Name | Date |
|---|---|---|
| 1,413,187 | Paumier | Apr. 18, 1922 |
| 1,586,071 | Cooke | May 25, 1926 |
| 1,612,860 | Fairchild | Jan. 4, 1927 |
| 1,728,633 | Schmidt | Sept. 17, 1929 |
| 1,787,309 | Goldbeck | Dec. 30, 1930 |
| 1,829,142 | Hyden | Oct. 27, 1931 |
| 1,953,304 | Lutz | Apr. 3, 1934 |
| 2,083,646 | Fuller | June 15, 1937 |
| 2,142,350 | Drakoff | Jan. 3, 1939 |
| 2,196,434 | Allstrom | Apr. 9, 1940 |
| 2,333,772 | Eaton | Nov. 9, 1943 |
| 2,351,508 | Hamilton | June 13, 1944 |
| 2,370,966 | Jochum | Mar. 6, 1945 |